United States Patent
Yokoi et al.

(10) Patent No.: US 10,663,229 B2
(45) Date of Patent: May 26, 2020

(54) COOLING APPARATUS OF HEATING FURNACE

(71) Applicant: CHUGAI RO CO., LTD., Osaka-shi, Osaka (JP)

(72) Inventors: Noriyuki Yokoi, Osaka (JP); Tadahiro Iwamoto, Osaka (JP)

(73) Assignee: CHUGAI RO CO., LTD., Osaka-shi (JP)

( * ) Notice: Subject to any disclaimer, the term of this patent is extended or adjusted under 35 U.S.C. 154(b) by 0 days.

(21) Appl. No.: 16/080,437

(22) PCT Filed: Apr. 24, 2017

(86) PCT No.: PCT/JP2017/016156
§ 371 (c)(1),
(2) Date: Aug. 28, 2018

(87) PCT Pub. No.: WO2018/037620
PCT Pub. Date: Mar. 1, 2018

(65) Prior Publication Data
US 2019/0093952 A1  Mar. 28, 2019

(30) Foreign Application Priority Data

Aug. 25, 2016 (JP) .................. 2016-164438

(51) Int. Cl.
*F23M 5/08* (2006.01)
*F27D 9/00* (2006.01)
(Continued)

(52) U.S. Cl.
CPC ............ *F27D 9/00* (2013.01); *F23D 11/36* (2013.01); *F23D 14/22* (2013.01); *F23D 14/66* (2013.01);
(Continued)

(58) Field of Classification Search
CPC . C21D 9/0062; F27B 1/24; F27B 3/24; F27B 15/16; F27B 2009/124; F27B 2009/126; F27D 1/12; F27D 2017/007
See application file for complete search history.

(56) References Cited

U.S. PATENT DOCUMENTS 4,304,549 A    12/1981  Pfau
4,797,087 A *  1/1989  Gitman ............... B05B 7/0861
                                                      239/423
(Continued)

FOREIGN PATENT DOCUMENTS

JP    55-28492 A    2/1980
JP    10-61915 A    3/1998
(Continued)

OTHER PUBLICATIONS

Written Opinion of the International Searching Authority dated Aug. 1, 2017, issued in counterpart International Application No. PCT/JP2017/016156 (3 pages, English translation).
(Continued)

*Primary Examiner* — Gregory A Wilson
(74) *Attorney, Agent, or Firm* — Westerman, Hattori, Daniels & Adrian, LLP

(57) ABSTRACT

According to the present invention, in a heating furnace in which a fuel is burned by mixing the fuel supplied through a fuel supply pipe with combustion air supplied through a combustion air supply pipe by a combustion burner, a cooling medium guiding pipe through which cooling air for cooling the fuel supply pipe is guided into the furnace is provided to the outer peripheral side of the fuel supply pipe, and a cooling water supply pipe through which cooling water is supplied via a cooling water adjusting valve is connected to the cooling medium guiding pipe.

7 Claims, 3 Drawing Sheets

(51) Int. Cl.
*F23D 14/22* (2006.01)
*F23D 14/78* (2006.01)
*F23L 7/00* (2006.01)
*F23L 9/00* (2006.01)
*F23D 11/36* (2006.01)
*F27B 9/36* (2006.01)
*F23L 15/02* (2006.01)
*F23D 14/66* (2006.01)

(52) U.S. Cl.
CPC .............. *F23D 14/78* (2013.01); *F23L 7/002* (2013.01); *F23L 9/00* (2013.01); *F23L 15/02* (2013.01); *F27B 9/36* (2013.01); *F23C 2203/30* (2013.01); *F23D 2900/14681* (2013.01); *F23L 2900/07008* (2013.01); *F27D 2009/0005* (2013.01); *F27D 2009/0016* (2013.01); *Y02E 20/348* (2013.01)

(56) References Cited

U.S. PATENT DOCUMENTS

| | | | |
|---|---|---|---|
| 6,969,250 B1* | 11/2005 | Kawamura | ............ B01D 53/46 110/213 |
| 2007/0130949 A1* | 6/2007 | Gangloff | ............... F01K 13/025 60/646 |
| 2010/0031858 A1* | 2/2010 | Orii | ........................... F23C 7/02 110/188 |
| 2013/0122442 A1* | 5/2013 | D'Agostini | ............. F23D 14/66 432/13 |

FOREIGN PATENT DOCUMENTS

| | | |
|---|---|---|
| JP | 11-181515 A | 7/1999 |
| JP | 2011-38690 A | 2/2011 |
| JP | 2011-202825 A | 10/2011 |

OTHER PUBLICATIONS

International Search Report dated Aug. 1, 2017, issued in counterpart International Application No. PCT/JP2017/016156 (2 pages).
Written Opinion of the International Searching Authority dated Aug. 1, 2017, issued in counterpart International Application No. PCT/JP2017/016156 (4 pages, only Japanese original).
Notification Concerning Transmittal of International Preliminary Report on Patentability (Form PCT/IB/326) issued in counterpart International Application No. PCT/JP2017/016156 dated Mar. 7, 2019, with Forms PCT/IB/373 and PCT/ISA/237. (6 pages).
Notification of Transmittal of Translation of the International Preliminary Report on Patentability (Form PCT/IB/338) issued in counterpart International Application No. PCT/JP2017/016156 dated Mar. 7, 2019, with Forms PCT/IB/373 and PCT/ISA/237. (6 pages).

* cited by examiner

COOLING APPARATUS OF HEATING FURNACE

TECHNICAL FIELD

The present invention relates to a heating furnace in which a fuel is burned by a combustion burner by mixing the fuel supplied through a fuel supply pipe with combustion air supplied through a combustion air supply pipe. Particularly, the heating furnace of the invention features a simple arrangement for cooling the inside of furnace in a short time.

BACKGROUND ART

The heating furnace has conventionally been used for heat treating a treatment object such as steel slab. The heating furnace employs the combustion burner for mixing the fuel supplied through the fuel supply pipe with the combustion air supplied through the combustion air supply pipe and burning the fuel inside a furnace.

A continuous heating furnace has also been used as such a heating furnace. The continuous heating furnace includes a plurality of the combustion burners arranged in a longitudinal direction thereof such that the treatment objects are continuously heat treated while sequentially moved through the inside of furnace in the longitudinal direction.

Such heating furnaces have the following problem. When the treatment objects such as steel slabs are heat treated in the heating furnace, scales are generated by oxidation of the treatment objects. The scales fall and gradually accumulate in the furnace. This leads to a need for maintenance work on the heating furnace by a worker who enters the inside of the furnace for removal of the scales and the like.

To allow the worker to enter the inside of the furnace for maintenance work of the heating furnace, the temperature in the furnace must be lowered to a level suitable for working.

In the practice of the art, the temperature in the furnace is lowered to the level suitable for working as follows. While stopping the combustion by cutting off the fuel supply through the fuel supply pipe, a blower is driven to feed a cooling air to the inside of furnace via the combustion air supply pipe such that the inside of furnace is cooled by the cooling air.

In the case where the cooling air is fed to the inside of furnace through the combustion air supply pipe so as to cool the inside of furnace, however, quite a long time is taken before the temperature in the furnace is lowered to the level suitable for working. Particularly, such a long time as a few days is taken in the case of the continuous heating furnace where the plural combustion burners are arranged in the longitudinal direction thereof and where the treatment objects are continuously heat treated while sequentially moved through the furnace in the longitudinal direction.

Heretofore, Patent Document 1 has disclosed a heating furnace which includes spray nozzles disposed at a ceiling and the like of the furnace in a manner to be insertable in the furnace. The heating furnace is adapted to lower the temperature in the furnace by stopping the combustion in the heating furnace, followed by feeding the cooling air to the inside of furnace as described above while inserting the spray nozzles in the furnace for spraying water from the spray nozzles onto the scales accumulated in the furnace. Further, disclosed in Patent Document 2 is a heating furnace which includes atomizing nozzles and spray nozzles similar to those of Patent Document 1 disposed at the ceiling and the like of the furnace in a manner to be insertable in the furnace. The heating furnace is adapted to lower the temperature in the furnace by stopping the combustion in the heating furnace, followed by feeding the cooling air to the inside of furnace as described above, while inserting the atomizing nozzles and spray nozzles in the furnace for spraying atomized cooling water in the furnace from the atomizing nozzles and spraying the water from the spray nozzles onto the scales accumulated in the furnace.

As stated in Patent Documents 1 and 2, however, the work of installing the spray nozzles or atomizing nozzles in the ceiling and the like of the heating furnace in the manner that the nozzles are insertable in the furnace is quite cumbersome and costly. Particularly, in the continuous heating furnace where the plural combustion burners are arranged in the longitudinal direction thereof and the treatment objects are continuously heat treated while sequentially moved in the longitudinal direction, a larger number of spray nozzles and atomizing nozzles are required so that the installation work takes a larger amount of time and increased costs.

In the case where the spray nozzles and the atomizing nozzles are disposed in the furnace in a manner to be insertable in the furnace, the spray nozzles and atomizing nozzles need to be inserted in the furnace each time. The work is extremely complicated and time-consuming. Furthermore, doing the work at a high-temperature area near the ceiling right after stopping combustion is highly risky. Further, in such heating furnaces where the treatment objects are heat treated therein by burning the fuel by the above-described combustion burners, it is necessary to block up mounting parts of the spray nozzles and atomizing nozzles with a cover material or the like so as to prevent heat in the furnace from leaking through the mounting parts of the spray nozzles and atomizing nozzles. This involves extremely cumbersome work. What is more, it is impractical to reliably prevent the heat leakage through the mounting parts or the cover material. There is also a problem concerning the decrease in thermal efficiency of the heating furnace.

CITATION LIST

Patent Documents

[Patent Document 1] JP-A No. 1999-181515
[Patent Document 2] JP-A No. 2011-202825

DISCLOSURE OF INVENTION

Technical Problem

The invention has an objective to provide solutions to the above-described problems encountered when the temperature in the heating furnace is lowered for maintenance work and the like of the heating furnace where the combustion burner mixes the fuel supplied through the fuel supply pipe with the combustion air supplied through the combustion air supply pipe and burns the fuel in the furnace.

Specifically, the object of the invention is to configure the above-described heating furnace to quickly cool the inside of furnace by means of the simple arrangement.

Solution to Problem

According to an aspect of the invention for solving the above problems, a heating furnace includes a combustion burner which mixes a fuel supplied through a fuel supply pipe with combustion air supplied through a combustion air supply pipe and burns the fuel in the inside of the furnace, and has an arrangement wherein a cooling medium guiding pipe which guides a cooling air for cooling the fuel supply pipe to the inside of furnace is provided on an outer peripheral side of the fuel supply pipe and wherein a cooling water supply pipe for supplying a cooling water via a cooling water adjusting valve is connected to the cooling medium guiding pipe.

According to another aspect of the invention, the heating furnace has an arrangement wherein when the combustion burner mixes the fuel supplied through the fuel supply pipe with the combustion air supplied through the combustion air supply pipe and burns the fuel in the furnace, the fuel supply pipe is cooled with the cooling air guided to the inside of the furnace through the cooling medium guiding pipe arranged on the outer peripheral side of the fuel supply pipe, and when the inside of furnace is cooled, the combustion by the combustion burner is stopped while the cooling water adjusting valve is opened to guide the cooling water through the cooling water supply pipe into the cooling medium guiding pipe so that the cooling water is sprayed in the inside of the furnace from the cooling medium guiding pipe.

If the fuel supply pipe is cooled with the cooling air guided to the inside of the furnace through the cooling medium guiding pipe arranged on the outer peripheral side of the fuel supply pipe when the fuel supplied through the fuel supply pipe is burned by the combustion burner as described above, the fuel supply pipe is prevented from being deformed or damaged by the heat during the combustion by the combustion burner and radiation heat from the inside of the furnace.

In order to cool the inside of the furnace, the combustion by the combustion burner is stopped while the cooling water adjusting valve is opened to guide the cooling water through the cooling water supply pipe into the cooling medium guiding pipe so that the cooling water is sprayed from the cooling medium guiding pipe to the inside of the furnace. This negates the need for separately providing the known spray nozzles or atomizing nozzles insertable in the inside of the furnace, nor for working to insert the nozzles at the high-temperature area near the ceiling. The inside of the furnace is efficiently and safely cooled with the cooling water sprayed from the cooling medium guiding pipe, as described above.

When the cooling water is sprayed from the cooling medium guiding pipe to the inside of the furnace, the cooling air together with the cooling water may be sprayed from the cooling medium guiding pipe to the inside of the furnace so that the cooling water in the form of mist is sprayed in the furnace. This makes the cooling water in mist form spread in the furnace so that a large area can be cooled quickly.

To cool the inside of a continuous heating furnace where a plurality of the combustion burners are arranged in a longitudinal direction thereof and the treatment objects are continuously heat treated while sequentially moved through the furnace in the longitudinal direction, the combustion by the combustion burners is stopped while the cooling water adjusting valves are opened to guide the cooling water through the cooling water supply pipes into the cooling medium guiding pipes so that the cooling water is sprayed from the cooling medium guiding pipes to the inside of the furnace. Even in the continuous heating furnace having a greater longitudinal length, the whole inside of the elongated furnace can be efficiently and concurrently cooled by the cooling water sprayed from the respective cooling medium guiding pipes.

According to another aspect of the invention, the heating furnace may employ, as the combustion burner, a regenerative combustion burner supplying the combustion air via a regenerator.

Advantageous Effects of Invention

In the heating furnace according to the invention, the fuel supply pipe is prevented from being deformed or damaged by the heat during the combustion by the combustion burner or the radiation heat from the inside of the furnace because the fuel supply pipe is cooled with the cooling air guided to the inside of the furnace through the cooling medium guiding pipe disposed on the outer peripheral side of the fuel supply pipe when the combustion burner mixes the fuel supplied through the fuel supply pipe with the combustion air supplied through the combustion air supply pipe and burns the fuel in the inside of the furnace.

In order to cool the inside of the heating furnace according to the invention, the combustion by the combustion burner is stopped while the cooling water adjusting valve is opened to guide the cooling water through the cooling water supply pipe into the cooling medium guiding pipe so that the cooling water is sprayed from the cooling medium guiding pipe to the inside of the heating furnace. This negates the need for providing the known spray nozzles or atomizing nozzles insertable in the inside of the furnace. The inside of the furnace can be efficiently cooled with the cooling water sprayed from the cooling medium guiding pipe, as described above.

DESCRIPTION OF EMBODIMENTS

A heating furnace according to an embodiment of the invention will hereinbelow be described in detail with reference to the accompanying drawings. It is noted that the heating furnace of the invention is not limited to the following embodiments but appropriate changes or modifications may be made thereto without departing from the spirit and scope of the invention.

Figure 1:
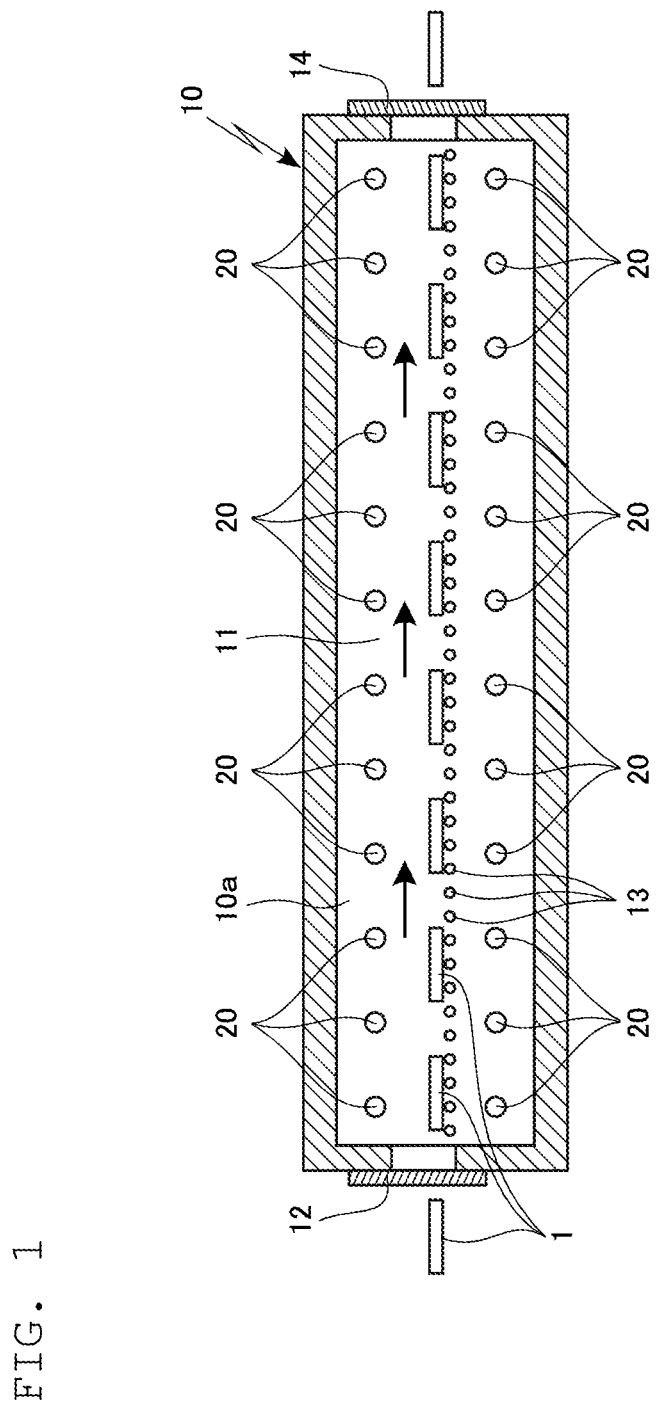
FIG. 1 is a schematic illustrative diagram of a heating furnace according to one embodiment of the invention, showing a structure of a continuous heating furnace where a plurality of combustion burners are arranged in a longitudinal direction thereof for sequentially heating treatment objects.

In a heating furnace 10 according to the embodiment, treatment objects 1 are heat treated in the inside of the furnace 11 as follows. As shown in FIG. 1, the treatment objects 1 are sequentially fed to the inside of the furnace 11 through a charging door 12 on a charging side of the heating furnace 10. The treatment objects 1 are sequentially moved through the inside of the furnace 11 by an in-furnace conveyor mechanism 13 such as feed rollers disposed in the inside of the furnace 11, while sequentially heat treated by a plurality of combustion burners 20 longitudinally arranged on a side wall 10a of the heating furnace 10. Subsequently, the treatment objects 1 are sequentially extracted from the inside of the furnace 11 through an extracting door 14 disposed on an extracting side of the heating furnace 10. The in-furnace conveyor mechanism 13 for sequentially moving the treatment objects 1 through the inside of the furnace 11 may employ, other than the above-described feed rollers, known feeding means such as walking beam.

Figure 2:
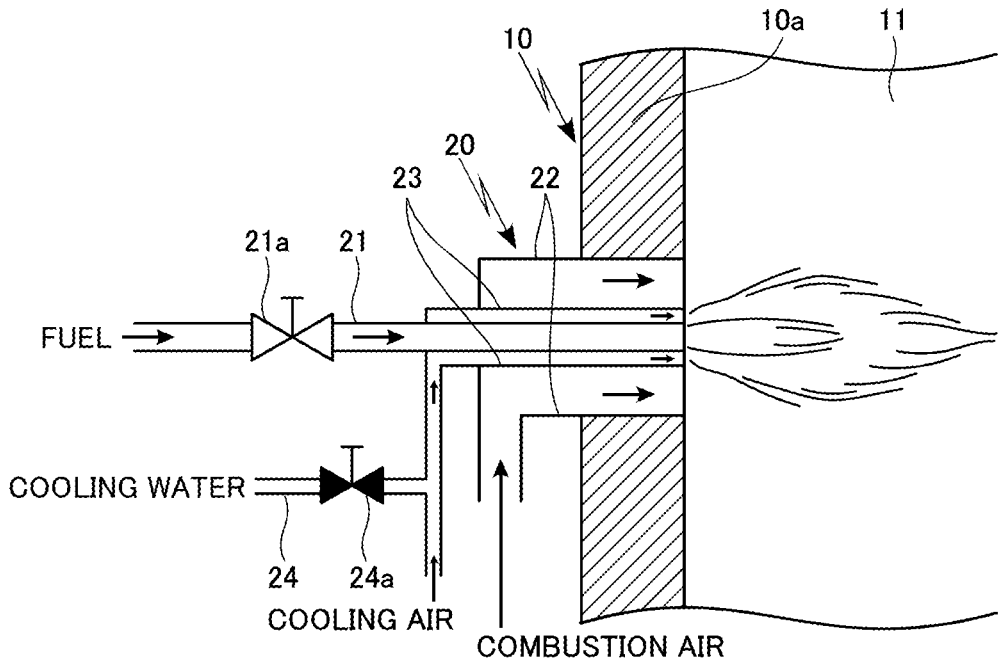
FIG. 2 is a schematic illustrative diagram of a combustion burner employed for fuel combustion by the heating furnace according to the above embodiment, showing how the combustion burner mixes a fuel supplied through a fuel supply pipe with a combustion air supplied through a combustion air supply pipe and burns the fuel in the inside of the furnace.
Figure 3:
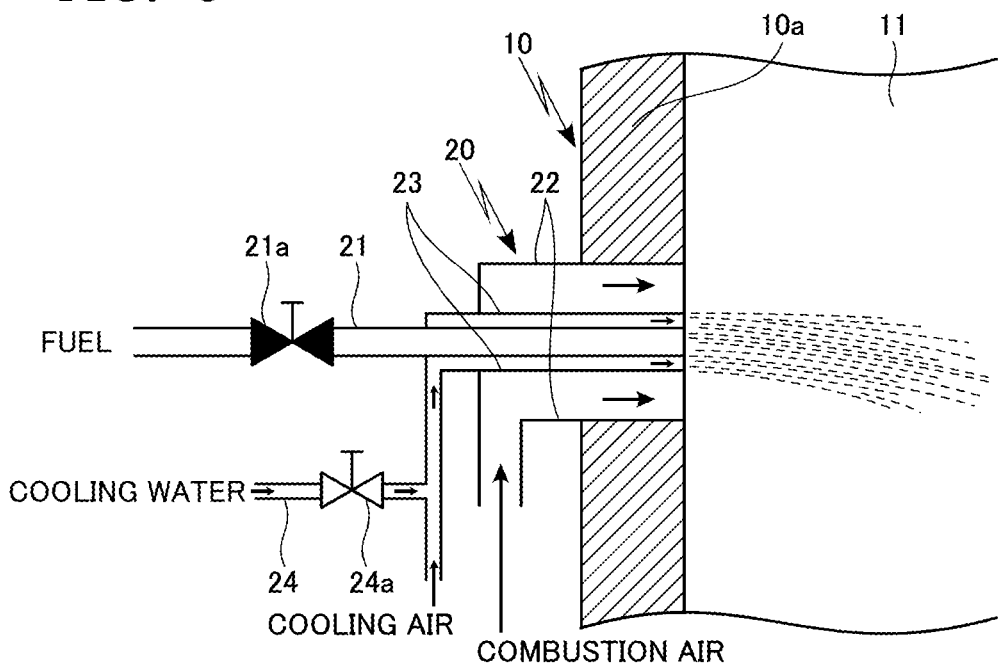
FIG. 3 is a schematic illustrative diagram of the heating furnace according to the above embodiment the inside of which is cooled, showing a state where the combustion by the combustion burner is stopped while a cooling water is guided through a cooling water supply pipe into a cooling medium guiding pipe, from which the cooling water is sprayed to the inside of the heating furnace.

In the heating furnace 10 according to the embodiment, the combustion burner 20 is configured to guide a combustion fuel to the inside of the furnace 11 through a fuel supply pipe 21 equipped with a fuel adjusting valve 21a, as shown in FIG. 2 and FIG. 3. The combustion burner further includes a combustion air supply pipe 22 configured to supply a combustion air as surrounding an outer periphery of the fuel supply pipe 21. That is, the combustion burner is adapted to supply the combustion air through the combustion air supply pipe 22 to an area around an outer periphery of the fuel flow to the inside of the furnace 11 via the fuel supply pipe 21.

A cooling medium guiding pipe 23 for guiding an air for cooling the fuel supply pipe 21 is arranged on an inner peripheral side of the combustion air supply pipe 22 in a manner to surround the outer periphery of the fuel supply pipe 21 via a required gap therebetween. The cooling medium guiding pipe 23 is connected with a cooling water supply pipe 24 for supplying a cooling water via a cooling water adjusting valve 24a.

In the heating furnace 10 according to the embodiment, the fuel is burned by the combustion burner 20 as follows in the inside of the furnace 11. As shown in FIG. 2, the fuel adjusting valve 21a is opened to guide the fuel through the fuel supply pipe 21 to the inside of the furnace 11. In the meantime, the combustion air is supplied from the combustion air supply pipe 22 surrounding the outer periphery of the fuel supply pipe 21 to the outer periphery side of the fuel guided to the inside of the furnace 11 via the fuel supply pipe 21. Thus, the fuel is burned in the inside of the furnace 11. At the same time, a cooling air is guided to the inside of the furnace 11 via the cooling medium guiding pipe 23 arranged on the outer peripheral side of the fuel supply pipe 21. The fuel supply pipe 21 is cooled with this cooling air so as to limit the deformation or damage of the fuel supply pipe 21 caused by heat during the combustion by the combustion burner 20 and radiation heat from the inside of the furnace 11. In the figures, an open state of each valve 21a, 24a is indicated by a white outlined symbol while a closed state thereof is indicated by a black solid symbol.

In a case where the temperature of the inside of the furnace 11 is lowered in order to perform maintenance work and the like of the heating furnace 10 of the embodiment, the combustion by the combustion burner 20 is stopped by closing the fuel adjusting valve 21a to inhibit the supply of fuel to the inside of the furnace 11 via the fuel supply pipe 21, as shown in FIG. 3. Meanwhile, the cooling water adjusting valve 24a is opened to guide the cooling water through the cooling water supply pipe 24 into the cooling medium guiding pipe 23. The cooling water is sprayed from the cooling medium guiding pipe 23 to the inside of the furnace 11 of the heating furnace 10. Thus, the temperature of the inside of the furnace 11 is lowered by cooling the inside of the furnace 11 with the sprayed cooling water.

This method negates the need for providing the known spray nozzles or atomizing nozzles insertable in the inside of the furnace 11 but permits the simple arrangement to accomplish efficient cooling of the inside of the furnace 11. In the arrangement where the inside of the furnace 11 is cooled by spraying the cooling water from the cooling medium guiding pipe 23 to the inside of the furnace 11, the cooling water can be atomized and sprayed in the inside of the furnace 11 by ejecting the cooling air together with the cooling water from the cooling medium guiding pipe 23. Further, the combustion air can also be supplied through the combustion air supply pipe 22 to the inside of the furnace 11 as the cooling air.

While the heating furnace 10 of the embodiment illustrates the case where the common combustion burner 20 is employed, the usable combustion burner 20 is not limited to this.

Figure 4:
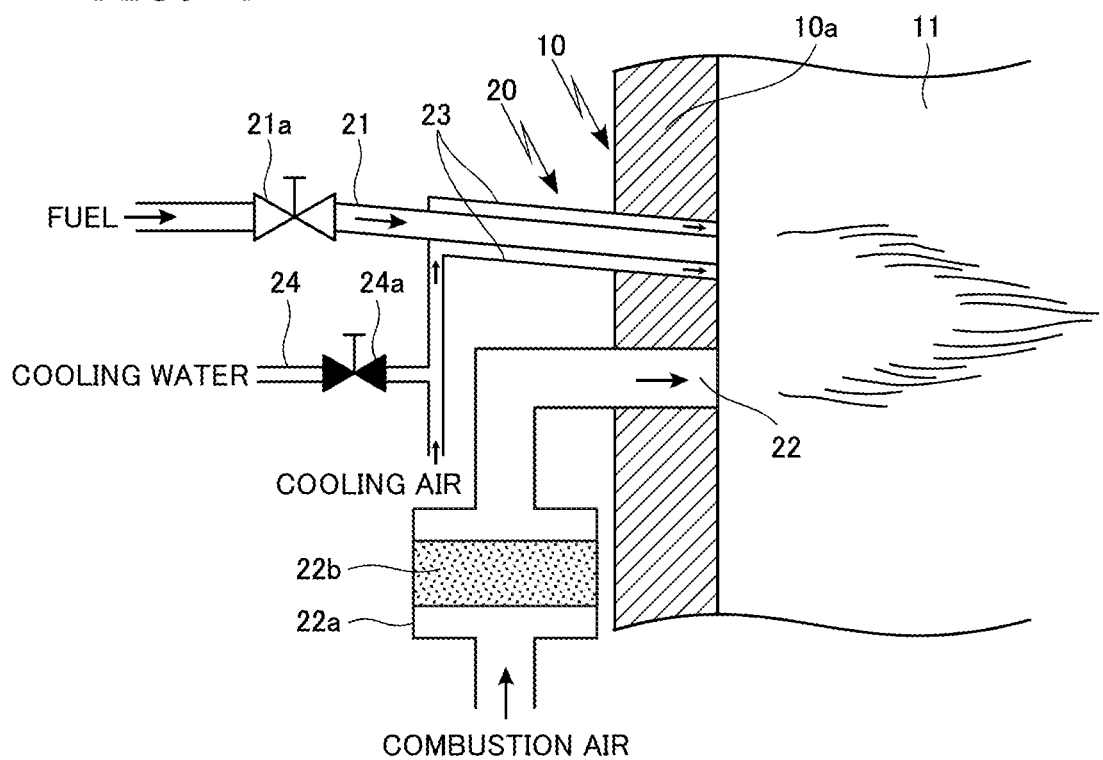
FIG. 4 is a schematic illustrative diagram of the heating furnace according to the above embodiment, showing a structure where a regenerative combustion burner is employed for fuel combustion.
Figure 5:
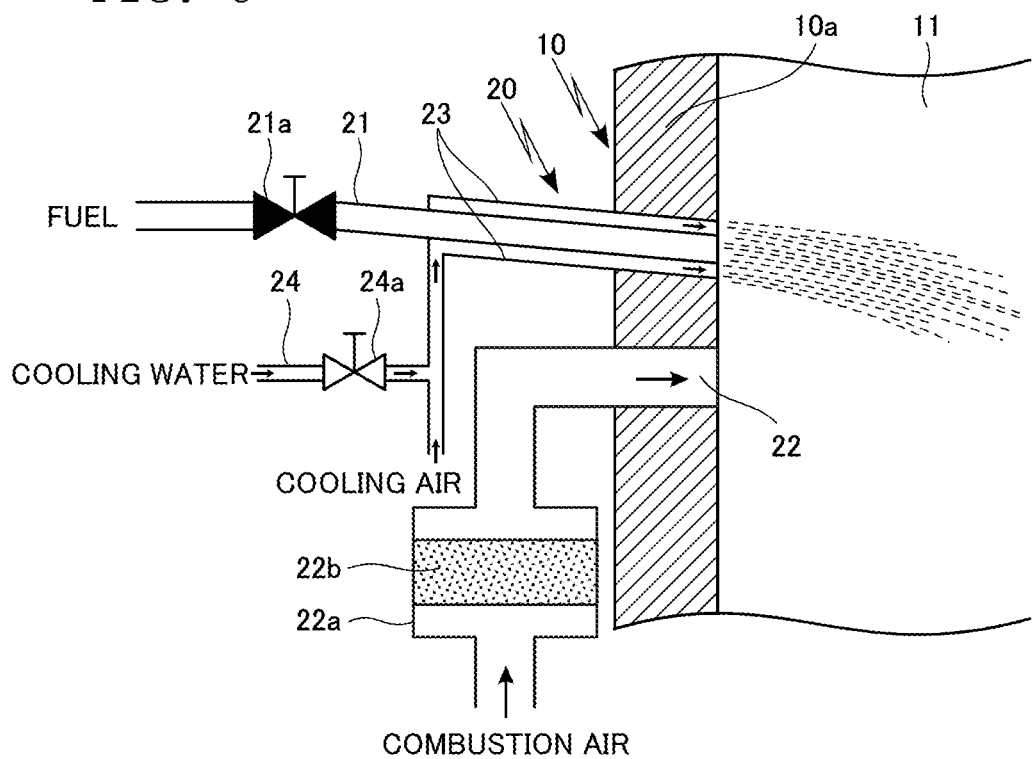
FIG. 5 is a schematic illustrative diagram of the heating furnace according to the above embodiment which employs the regenerative combustion burner, showing how the inside of the heating furnace is cooled.

As illustrated by a heating furnace 10 shown in FIG. 4 and FIG. 5, for example, a regenerative combustion burner 20 is also usable. The regenerative combustion burner is configured to heat the combustion air by means of a heat storage material 22b accommodated in a regenerator 22a and to supply the heated combustion air to the inside of the furnace 11 via the combustion air supply pipe 22.

In the heating furnace 10 employing the above-described regenerative combustion burners 20, as well, the fuel is burned as follows by the combustion burner 20 in the inside of the furnace 11. As shown in FIG. 4, the fuel adjusting valve 21a is opened to guide the fuel through the fuel supply pipe 21 to the inside of the furnace 11, while the combustion air heated by the heat storage material 22b is sprayed from the combustion air supply pipe 22 to the fuel guided into the inside of the furnace 11 via the fuel supply pipe 21. The fuel is burned with the heated combustion air in the inside of the furnace 11, while the cooling air is guided to the inside of the furnace 11 through the cooling medium guiding pipe 23 arranged on the outer peripheral side of the fuel supply pipe 21 so that the fuel supply pipe 21 is cooled with the cooling air. This limits the deformation or damage of the fuel supply pipe 21 caused by the heat during the combustion by the combustion burner 20 and the radiation heat from the inside of the furnace 11.

In the case where the temperature of the inside of the furnace 11 is lowered in order to perform the maintenance work and the like of the above-described heating furnace 10, the combustion by the combustion burner 20 is stopped by closing the fuel adjusting valve 21a to inhibit the supply of fuel to the inside of the furnace 11 via the fuel supply pipe 21, as shown in FIG. 5. Meanwhile, the cooling water adjusting valve 24a is opened to guide the cooling water through the cooling water supply pipe 24 into the cooling medium guiding pipe 23, from which the cooling water is sprayed to the inside of the furnace 11 of the heating furnace 10. Thus, the temperature of the inside of the furnace 11 is lowered by cooling the inside of the furnace 11 with the sprayed cooling water.

While the heating furnace 10 of the embodiment illustrates the continuous heating furnace 10 where the treatment objects 1 charged in the inside of the furnace 11 are sequentially moved through the inside of the furnace 11 and sequentially heat treated by the plural combustion burners 20 longitudinally disposed on the side wall 10a of this heating furnace 10, the type of the heating furnace 10 is not limited to this. The invention is also applicable to a batch type heating furnace (not shown) where the treatment objects are not moved through the inside of the furnace 11.

Regarding the heating furnace 10 shown in FIG. 4 and FIG. 5, the description is made for convenience only in the case where the combustion air supply pipe 22 ejects the combustion air. In practice, the heating furnace is also provided with a pipe arrangement (not shown) for sucking an exhaust gas for heating the heat storage material 22b accommodated in the regenerator 22a.

REFERENCE SIGNS LIST

1: treatment object
10: heating furnace
10a: side wall
11: inside of the furnace
12: charging door
13: in-furnace conveyor mechanism
14: extracting door
20: combustion burner
21: fuel supply pipe
21a: fuel adjusting valve
22: combustion air supply pipe
22a: regenerator
22b: heat storage material
23: cooling medium guiding pipe
24: cooling water supply pipe
24a: cooling water adjusting valve

The invention claimed is:

1. A heating furnace comprising a combustion burner which mixes a fuel supplied through a fuel supply pipe with a combustion air supplied through a combustion air supply pipe and burns the fuel in the inside of the furnace, wherein
a cooling medium guiding pipe which guides a cooling air for cooling the fuel supply pipe to the inside of furnace is arranged on an outer peripheral side of the fuel supply pipe,
a cooling water supply pipe for supplying a cooling water via a cooling water adjusting valve is connected to the cooling medium guiding pipe, and
when the combustion burner mixes the fuel supplied through the fuel supply pipe with the combustion air supplied through the combustion air supply pipe and burns the fuel in the inside of furnace, the fuel supply pipe is cooled with the cooling air guided to the inside of furnace through the cooling medium guiding pipe arranged on the outer peripheral side of the fuel supply pipe, and when the inside of furnace is cooled, the combustion by the combustion burner is stopped while the cooling water adjusting valve is opened to guide the cooling water through the cooling water supply pipe into the cooling medium guiding pipe so that the cooling water is sprayed from the cooling medium guiding pipe to the inside of furnace.

2. The heating furnace according to claim 1, wherein when the cooling water is sprayed from the cooling medium guiding pipe to the inside of furnace, the cooling air together with the cooling water is sprayed from the cooling medium guiding pipe to the inside of furnace so that the cooling water in the form of mist is sprayed in the inside of furnace.

3. The heating furnace according to claim 2, wherein a plurality of the combustion burners are arranged in a longitudinal direction of the furnace.

4. The heating furnace according to claim 2, wherein a regenerative combustion burner which supplies the combustion air through a regenerator is employed as the combustion burner.

5. The heating furnace according to claim 1, wherein a plurality of the combustion burners are arranged in a longitudinal direction of the furnace.

6. The heating furnace according to claim 5, wherein a regenerative combustion burner which supplies the combustion air through a regenerator is employed as the combustion burner.

7. The heating furnace according to claim 1, wherein a regenerative combustion burner which supplies the combustion air through a regenerator is employed as the combustion burner.

* * * * *